United States Patent [19]

Beleck

[11] Patent Number: 5,599,884
[45] Date of Patent: Feb. 4, 1997

[54] AMINO RESIN DISPERSION WITH REDUCED ALDEHYDE CONTENT, PROCESS THEREFOR, AND PAINT DETACKIFYING PROCESS THEREWITH

[75] Inventor: Scott J. Beleck, St. Clair Shores, Mich.

[73] Assignee: Henkel Corporation, Plymouth Meeting, Pa.

[21] Appl. No.: 437,265

[22] Filed: May 8, 1995

Related U.S. Application Data

[63] Continuation-in-part of Ser. No. 215,098, Mar. 29, 1994, Pat. No. 5,454,516, which is a continuation-in-part of Ser. No. 970,727, Nov. 3, 1992, abandoned.

[51] Int. Cl.$^6$ ............... C08F 283/00; C08G 8/28; C08L 61/00; C08L 61/20; C08L 61/34
[52] U.S. Cl. ............... 525/509; 525/519; 528/492; 528/493; 528/491; 528/484; 524/592; 524/597; 524/598
[58] Field of Search ............... 525/509, 519; 528/492, 493, 491, 484; 524/592, 597, 598

[56] References Cited

U.S. PATENT DOCUMENTS

| 3,634,038 | 9/1969 | Rampy | 23/253 |
|---|---|---|---|
| 4,656,059 | 4/1987 | Mizuno et al. | 427/345 |
| 5,112,652 | 5/1992 | Greene | 427/342 |

OTHER PUBLICATIONS

CHEMetrics Vacu–Vials® self–filling ampoules for photometric analysis No. K–4203.

Eastman Chemicals BKB (beta–Ketobutyramide or Acetoscetemide).

*Primary Examiner*—Paul R. Michl
*Assistant Examiner*—U. K. Rajguru
*Attorney, Agent, or Firm*—Wayne C. Jaeschke; Norvell E. Wisdom, Jr.; Julie R. Keller

[57] ABSTRACT

Amino resins that contain more free formaldehyde than is desirable for health and/or pollution reasons can be treated with a mixture of diketo reagents (or their nitrogen analogs) and other compounds containing amino moieties to reduce the free formaldehyde content while not diminishing, and in some cases even enhancing, the ability of the resins to function according to their normal uses. The invention is especially useful for melamine-formaldehyde resin dispersions useful to detackify paint.

13 Claims, No Drawings

AMINO RESIN DISPERSION WITH REDUCED ALDEHYDE CONTENT, PROCESS THEREFOR, AND PAINT DETACKIFYING PROCESS THEREWITH

CROSS-REFERENCE TO RELATED APPLICATIONS

This application is a continuation-in-part of application Ser. No. 08/219,058 filed Mar. 29, 1994, now U.S. Pat. No. 5,454,516 which was a continuation-in-part of application Ser. No. 970,727 filed Nov. 3, 1992 and now abandoned.

BACKGROUND OF THE INVENTION

1. Field of the Invention

In one of its embodiments, this invention relates to processes of reducing the aldehyde content of amino resins by a process that does not cause any instability, such as gelation or formation of a precipitate, to occur in the amino resin after treatment or reduce the utility of the resins for their intended ultimate purpose. In another embodiment, the invention relates to compositions, which can be added to amino resins which have higher aldehyde contents than is desirable, in order to reduce their aldehyde content without (i) causing any instability, (ii) making the resin with reduced aldehyde less suitable for its intended use, or (iii) requiring any removal from the resin of the additive composition itself or any reaction products therefrom, in order to avoid impairing the intended useful properties thereof. Another embodiment of the inventions relates to amino resins that have had their aldehyde content reduced by a process according to the invention.

Still another embodiment of the invention relates to the detackification of paint and similar materials entrained in water, particularly circulating water in a conventional automobile plant spray booth, with the use of a process or product according to the invention as described above. "Paint" as used herein is to be understood as a generic term which encompasses all common varieties of water insoluble organic binder containing coatings commonly applied in spraying operations, including but not limited to oil based paints, enamels, lacquers, high solids solvent based automotive body base coat, high solids solvent based automotive body clear coat, water borne auto body base and clear coats, urethane polymer containing auto body top coats, and solvent and water borne primers. These paints may utilize asphaltic, acrylic, polyester, melamine-formaldehyde, isocyanate, epoxy, alkyd, melamine alkyd, and blocked polyurethane resins among others, along with appropriate solvents, pigments, and ancillary additives. Paint "overspray", the portion of the sprayed paint which does not fall on the surface(s) it is intended to protect, if left untreated, readily adheres to the walls of spray booths and to any other surfaces that it contacts, such as the surfaces of water distribution piping, spray nozzles, and the like. Use of a process according to this embodiment of the invention converts the paint overspray to a non-sticky sludge suitable for convenient disposal.

2. Statement of Related Art

For the purposes of this description, the term "amino resins", unless specifically limited, is to be understood to include (i) any collection of molecules that satisfies the following two conditions: (ii) at least some of the molecules have been formed or could be formed by at least one addition reaction between a molecule containing a —CHO (aldehydo) moiety and a molecule containing an amino (i.e., —NH$_2$) moiety to form a single molecule product in which the nitrogen atom from the amino moiety has become covalently bonded to the carbon atom from the aldehydo moiety and (iii) the entire collection of molecules is capable of further reaction, without the addition of any outside ingredients, to form polymer molecules, each of which contains at least 10 nitrogen atoms and (ii) all liquid solutions and dispersions, in water or other compounds that are liquid at normal atmospheric pressure at a temperature of 20° C., of materials that are amino resins according to the definition of part (i) of this sentence. When necessary to distinguish between these two classes of amino resins, the latter class will be denoted herein as "amino resin dispersions" and the former class as "amino resins, solids basis".

In commercially available amino resins, the aldehyde is almost always formaldehyde, and most of the remainder of this specification will therefore be directed toward resins in which all or most of the aldehyde molecules from which the resin was or could be formed are formaldehyde molecules. However, this description is meant to apply, mutatis mutandis, to resins with other types of aldehydes.

A much more diverse group of amino group containing compounds, many of which are themselves amino resins according to the definition given above, are used to form commercially available or otherwise previously known types of amino resins. These include, but are not necessarily limited to, urea, alkyl substituted ureas, thiourea and alkyl substituted thiourea, melamine, benzoguanamine, ethyleneurea (i.e., 2-imidazolidinone), dimethylolethyleneurea (i.e., 1,3-bis[hydroxymethyl]-2-imidazolidinone), propyleneurea (i.e., tetrahydro-2-pyrmidinone), dimethylolpropyleneurea (i.e., 1,3-bis[hydroxymethyl]tetrahydro-2-pyrmidinone), methylol urea, dimethylol urea, acetoguanamine, acrylamide, N-methylolacrylamide, aniline, toluene sulfonamide, N,N'-dimethylol derivatives of tetrahydro-5-alkyl-s-triazones, 1,3-bis(methoxymethyl)uron, and 1,3-bis(hydroxymethyl)-4,5-dihydroxy-2-imidazolidinone (also known as "dimethyloldihydroxyethyleneurea" or "DMDHEU"), and trimethylolmelamine and ethers thereof. Most of the remainder of the description will focus on melamine-formaldehyde resin, because they are particularly preferred in the specialized field of paint detackifying, to which one embodiment of this invention is directed. However, the description should be understood as applying, mutatis mutandis, to other amine-aldehyde, and particularly other amine-formaldehyde, oligomers and polymers.

It is known in the art to use a melamine-aldehyde polymer, particularly a melamine-formaldehyde resin acid colloidal solution, as an effective treatment for detackification. However, the previously known polymers of this type made from formaldehyde usually contain substantial amounts of free formaldehyde. For example, most commercial liquid melamine-formaldehyde resins contain at least 0.2% by weight of free formaldehyde. (Hereinafter, all percentages are to be understood as percentages by weight unless otherwise stated.) Formaldehyde is believed to be a carcinogen, so that use of materials containing more than a minimal amount of it is undesirable in general.

DESCRIPTION OF THE INVENTION

General Principles of Description

In this description, except in the claims and the specific examples and in other parts where expressly indicated to the contrary, all numbers specifying amounts of materials or conditions of reaction or use are to be understood as modified by the term "about" in determining the broadest scope of the invention. Practice of the invention within the numerical limits given is generally preferred, however. Also, unless it is explicitly stated to the contrary, wherever individual members of a class are described as suitable or preferred for a given purpose, it is to be understood that mixtures of one or more members of the class are equally suitable or preferred for the same purpose.

Summary of the Invention

It has been found that the formaldehyde content of amino resins can be more advantageously reduced for many purposes by a combination of additives that react with formaldehyde rather than a single one. Specifically, preferred combinations according to this invention comprise, preferably consist essentially of, or more preferably consist of:

(A) a component consisting of at least one type of molecules that are soluble in the amino resin to be treated and are selected from the group consisting of organic β-diketo moiety containing molecules and their nitrogen analogs, that is, molecules containing a structure according to formula I below:

(I)

in which each of $Q^1$ and $Q^3$ independently is one of $=O, =NH, or \equiv N; Q^2 is C or N;$ and each of the free bonds shown in formula I can be bonded to any other moieties that do not interfere with reaction with aldehydes (the abbreviation "DKA", from "diketo and analogs", being usually used hereinafter to include both actual diketo compounds and their nitrogen analogs); and (B) a component selected from molecules that do not belong to component (A) but do contain at least one amino moiety that can react with an aldehyde molecule to form a single molecule product in which the nitrogen atom from the amino moiety has become covalently bonded to the carbon atom from the aldehydo moiety.

Combinations according to the invention are especially advantageous because of a combination of economic and technical reasons: At least some compounds made up of molecules suitable for component (B) as defined above are relatively cheap per amount of formaldehyde to be reacted, but they are likely to cause slow but continuing formation of precipitates when added to amino resin dispersions. The formation of precipitates during storage of resins often gives rise to serious fouling of pumps and feed lines used for handling the resins on a large scale, necessitating expensive cleaning procedures and lost production. DKA additives are relatively expensive and require fairly large amounts of additive to remove any given amount of formaldehyde. (Two molecules of the DKA compounds as defined above are believed to react irreversibly with one molecule of free formaldehyde to produce the following chemical structure:

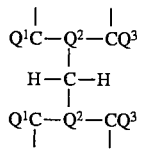

in which the formaldehyde formerly present is bound into a substantially nonvolatile form.) However, these DKA additives have been found not to cause precipitates themselves, and also to be capable of preventing the formation of precipitates when used together with the less expensive materials of component (B). Hence the combination is more practically valuable than either component alone.

The disclosure in U.S. Pat. 4,656,059 of Apr. 7, 1987 to Mizuno et al. of melamine-formaldehyde resins and their use in detackification, except to the extent contrary to any explicit statement herein, is hereby incorporated herein by reference. It has been found that melamine-formaldehyde resins of the type disclosed in this Mizuno patent can be reacted with either DKA additives or a combination of DKA and other compounds containing formaldehyde reactive amino moieties, to produce a modified resin dispersion with a free formaldehyde content in the modified resin dispersions that is no more than 80% by weight of the free formaldehyde content of the original melamine-formaldehyde dispersion reacted with the DKA modifying reagent and that is also no more than 0.20%,by weight, based on the weight of the modified resin dispersion or preferably is, with increasing preference in the order given, not more than 0.18, 0.17, 0.16, 0.15, 0.14, 0.13, 0.12, 0.11, 0.10, 0.095, 0.090, 0.085, 0.080, 0.075, 0.070, or 0.066% by weight, based on the modified resin dispersion of the total resin and that the thus modified resin is still effective for detackifying paint. The content of free formaldehyde in a given volume or mass of either the starting resin or the modified resin is defined as the product of the free formaldehyde concentration and the volume (or the mass, if the concentration has been measured per unit mass instead of unit volume). The thus modified melamine-formaldehyde resins may advantageously be combined with other materials, such as flocculants, defoamers, and the like, to maximize the practical value of their detackifying and flocculating effect, in a manner generally known per se in the art for using unmodified melamine-formaldehyde resins in detackification.

Various embodiments of the invention include aqueous liquid compositions including amino resins modified to reduce their free formaldehyde content, particularly melamine-formaldehyde resins that are useful in detackifying when added to the circulating water in spray booths, processes for making such modified amino resins, and processes, including detackifying processes, using the compositions containing the modified amino resins. The detackifying processes are especially advantageously used as part of processes comprising steps of (I) detackifying and flocculating paint entrained in a circulating water based liquid to produce a flocculated sludge, (II) separating detackified and flocculated paint solids from residual water based liquid, and (III) using the residual water based liquid to entrain additional paint. However, detackifying may be achieved according to this invention in a variety of other ways which are generally, except for the particular detackifying agent used, known per se in the art and are all within the broad scope of this invention.

Description of Preferred Embodiments

The most preferred water-soluble diketo compound for use in the invention is acetoacetamide, also known as β-ketobutyramide (CAS Registry No. 5977-14-0). Other suitable DKA modifying reagents include β-ketocarboxylic acids and their salts, esters, amides, and the like, such as acetoacetic acid or its ethyl ester and β-diketones, such as acetylacetone.

In an especially preferred embodiment of the invention, the use of DKA compounds or their nitrogen analogs is combined with urea, which is normally the most preferred choice for component (B) as defined above, because it is low in cost and effective in formaldehyde reduction. Most of the description will be specific to urea, but it is to be understood that other compounds containing formaldehyde reactive amino moieties can be substituted for urea.

The base melamine-formaldehyde polymer for use in the embodiment of this invention relating specifically to paint detackification preferably is made by reacting melamine and formaldehyde, in a manner known in the art, with each other in a molar ratio of formaldehyde to melamine in the range from 6:1 to 1:1, preferably from 4:1 to 1:1, or more preferably from 3.0:1.0 to 1.0:1.0. For a concentrate, the form in which a composition according to this invention would normally be shipped to the point of use, the concentration of dispersed polymer solids preferably is, with increasing preference in the order given, not less than 1, 3, 6.0, 7.0, or 8.0%; independently, the concentration of dispersed polymer solids preferably is, with increasing preference in the order given, not more than 20, 15, 12.0, 10.0, or 9.0%. The concentration of free formaldehyde preferably is, with increasing preference in the order given, not less than 0.10, 0.15, 0.16, 0.17, or 0.18% and independently preferably is, with increasing preference in the order given, not more than 0.35, 0.30, 0.25, 0.22, 0.21, 0.20, or 0.19%. The pH preferably is, with increasing preference in the order given, not less than 1.0, 1.3, 1.5, 1.7, 1.8, or 1.9 and independently preferably is, with increasing preference in the order given, not more than 3.0, 2.8, 2.6, 2.3, 2.2, 2.1, or 2.0. (All the preferences in this paragraph are for the resin before addition of formaldehyde reducing additives, but except for the formaldehyde concentration, they also apply to the modified resin after treatment.)

If the concentration of melamine-formaldehyde resin is reduced to too low a value, by the addition of large amounts of a DKA modifying reagent or of solvent such as water in which the DKA modifying reagent may be dissolved, the detackifying effectiveness of the modified resin dispersion will suffer. On the other hand, when the amount of modifying reagent is within the preferred ranges, the detackifying effectiveness in many cases is actually increased over that of the unmodified polymer dispersion. The amounts of DKA compound and/or urea added should not be so large as to result in any visible formation of precipitate within 15 days after addition and storage age at normal ambient temperatures (20° to 30 ° C.). Preferably, with increasing preference in the order given, compositions made according to this invention remain free of any visible precipitate for 20, 30, 40, 50, 60, 70, 80, 90, 100, 120, 150, or 180 days after the addition of DKA compounds and/or urea to the starting melamine-formaldehyde polymer containing dispersion.

The amount of acetoacetamide added, when it is used without any urea, preferably has, with increasing preference in the order given, a ratio by weight to the initial free formaldehyde content of the amino resin dispersion reacted with it that is not greater than 135:1.0, 100:1.0, 85:1.0, 75:1.0, 67:1.0, 61:1.0, 55:1.0 or 52:1.0; independently, the amount of acetoacetamide added when used without urea preferably has, with increasing preference in the order given, a ratio by weight to the initial free formaldehyde content of the polymer dispersion reacted with it that is not less than 6:1.0, 13:1.0, 18:1.0, 23:1.0, 27:1.0, 30:1.0, or 33:1.0. When acetoacetamide is used together with urea, the amount of acetoacetamide added preferably has, with increasing preference in the order given, a ratio by weight to the initial free formaldehyde content of the polymer dispersion reacted with it that is not greater than 50:1.0, 25:1.0, 20:1.0, 15:1.0, 11:1.0, 8.0:1.0, 7.0:1.0, 6.0:1.0, 5.0:1.0, 4.0:1.0, 3.0:1.0, 2.5:1.0, 2.0:1.0, 1.8:1.0, or 1.65:1.0; independently, the amount of acetoacetamide added when used with urea preferably has, with increasing preference in the order given, a ratio by weight to the initial free formaldehyde content of the polymer dispersion reacted with it that is not less than 0.5:1.0, 0.8:1.0, 1.0:1.0, 1.2:1.0, 1.3:1.0, 1.4:1.0, or 1.5:1.0. When the DKA reagent is not acetoacetamide, the preferred amounts given above should be adjusted to provide the same number of units according to formula I above as do the specified amounts of acetoacetamide. The amount of acetoacetamide that provides the same number of units according to formula I above as some other DKA modifying reagent is defined for use later in this specification as the "stoichiometric equivalent as acetoacetamide" of the other reagent and is abbreviated "SEA" hereinafter, and the stoichiometric equivalent as acetoacetamide of the total of the unreacted DKA modifying reagent molecules and of the originally added but reacted DKA modifying reagent molecules is defined as the "TSEA" (for "total stoichiometric equivalent as acetoacetamide") value.

Independently, for any DKA modifying reagent, whether alone or in combination with urea, the amount of modifying reagent added preferably is such as to result in a free formaldehyde content of the modified resin dispersion 24 hours after the addition of the formaldehyde content modifying reagent(s) that is, with increasing preference in the order given, not greater than 65, 57, 50, 45, or 40% of the free formaldehyde content of the starting resin dispersion used to make the modified resin dispersion; independently, the amount of modifying reagent added preferably is such as to result in a free formaldehyde content of the modified resin dispersion 24 hours after the addition of the formaldehyde content modifying reagent(s) that is, with increasing preference in the order given, not less than 5, 10, 15, 18, or 20% of the free formaldehyde content of the starting resin dispersion used to make the modified resin dispersion.

When component (B) as defined above is used, the compound(s) actually used as part of component (B), if not urea itself, are measured for purposes of this description by the amount of urea that provides the same number of formaldehyde reactive amino moieties as the amount of the compound actually used, and this value for a single compound used as component (B) or the sums of all such values if more than one compound is used for component (B) is denoted herein as the "TSEU" value (from "total stoichiometric equivalent as urea". Any material within the scope of part (B) above that was originally added to an amino resin and later reacts is still considered part of the TSEU value.) The ratio by weight of the TSEU value for component (B) to the TSEA value for component (A) preferably is, with increasing preference in the order given, not less than 1.0:100, 1.0:60, 1.0:30, 1.0:20, 1.0:15, 1.0:12.0, 1.0:10.0, 1.0:9.0, 1.0:8.0, or 1.0:7.6 and independently preferably is, with increasing preference in the order given, not greater than 1.0:0.40, 1.0:0.80, 1.0:1.2, 1.0:1.6, 1.0:2.0, 1.0:2.4, 1.0:2.8, 1.0:3.2, 1.0:3.6, 1.0:4.0, 1.0:4.4; 1.0:4.8, 1.0:5.2, 1.0:5.6, 1.0:6.0, or 1.0:6.4.

Independently, it is preferred that the modified detackifying composition have a concentration of melamine-formaldehyde polymer solids that is at least 50, more preferably at least 62, or still more preferably at least 75,% of the concentration of melamine-formaldehyde polymer solids in the starting resin from which the detackifying composition is made.

In a concentrate product to be added to water for detackification, the content of melamine-formaldehyde resin solids preferably is, with increasing preference in the order given, not less than 1.9, 2.7, 3.6, 4.0, 4.5, 4.8, or 5.0% and independently preferably is, with increasing preference in the order given, not greater than 50, 35, 20, 17, 14, 11, 10, 9.0, 8.5, or 8.0%.

One major embodiment of the invention is a modified concentrated detackifying composition comprising, preferably consisting essentially of, or more preferably consisting of, water and:

(A) dispersed melamine-formaldehyde polymer solids;

(B) free formaldehyde;

(C) products of reaction between free formaldehyde and water soluble DKA modifying reagent molecules; and, optionally one or more of the following, the first being preferred:

(D) products of reaction between free formaldehyde and urea;

(E) unreacted urea; and (F) unreacted DKA modifying reagent molecules.

The free formaldehyde content for purposes of this invention is preferably measured, and for the specific values given below was measured, by a method utilizing quantitative spectrophotometric absorbance of light with a wave length of 550 nanometers (hereinafter "nm") in conjunction with commercially supplied reagents and apparatus which convert the formaldehyde in a sample to a colored reaction product. The needed reagents and apparatus are supplied by CHEMetrics, Inc. of Calverton, Va. and are believed to be described in U.S. Pat. No. 3,634,038. The Vacu-vials® needed have the Catalog No. K-4203 and employ a highly sensitive reagent called "Purpald®" which reacts with formaldehyde in alkaline solution to produce a purple color. With the aid of calibrating standards, the absorbance of the solution prepared as directed by the manufacturer of these Vacu-vials® can be converted directly to a free formaldehyde concentration, after appropriate quantitative dilution of the sample if necessary to bring the concentration of free formaldehyde in the photometric cell within the range of 0 to 10 parts per million by weight (hereinafter "ppm") of free formaldehyde.

The reaction between acetoacetamide, other DKA modifying reagent, and/or urea and the formaldehyde containing polymer may be effected at any temperature at which the polymer dispersion is liquid. Normally, ambient human comfort temperature in the range from 20°–30° C. is preferred, both for convenience and because higher temperatures have been observed to increase the amount of free formaldehyde present in the starting melamine-formaldehyde resin and thereby require the addition of more of the modifying reagent(s). The normal time between commercial manufacture and use of the modified resins will be sufficient for reaction at ambient temperature, as will be apparent from the data in the examples below.

Modification of polymer dispersions as contemplated by this invention includes not only the reduction of the initial free formaldehyde content but the retention within the modified polymer dispersion of any products of reaction between the free formaldehyde initially present and the added modifying reagent(s), along with any unreacted modifying agent(s).

For actual use according to one preferred embodiment, a modified melamineformaldehyde polymer dispersion concentrate according to this invention as described above is preferably added to water containing entrained paint to be detackified and/or flocculated, preferably in an amount to give a ratio by weight of solids content in the modified polymer dispersion to solids content of the paint to be detackified that preferably is, with increasing preference in the order given, not less than 0.01:1.0, 0.03:1.0, 0.05:1.0, 0.07:1.0, 0.09:1.0, 0.11:1.0, 0.13:1.0, 0.14:1.0, or 0.15:1.0 and independently preferably is, with increasing preference in the order given, not more than 5.0:1.0, 2.5:1.0, 1.5:1.0, 1.0:1.0, 0.70:1.0, 0.50:1.0, 0.40:1.0, 0.35:1.0, 0.31:1.0, 0.28:1.0, 0.25:1.0, or 0.23:1.0. Detackified paint is then removed from the circulating water by any convenient means.

The invention may be further appreciated by consideration of the following non-limiting examples and comparison examples.

GROUP I-WITHOUT UREA

Examples of Preparation of Modified Dispersions

In these examples, the starting melamine-formaldehyde polymer dispersion was MAGNIFLOC™ 515C, a commercial product available from American Cyanamid Corp. with the following characteristics as described by its manufacturer: A specific The source of acetoacetamide used as the DKA modifying reagent was BKB™, commercially available from Eastman Chemical Co. and described by its supplier as a 30% solution of acetoacetamide in water. These two ingredients, along with additional water in some cases, were mixed, with stirring for the first eight hours, and then maintained in loosely stoppered containers for time periods up to 40 days, with samples periodically removed for assay of the free formaldehyde content. Some results are shown in Table 1 below. These results indicate that within one day at the latest after mixing, the free formaldehyde content of the mixture had become low enough to qualify all these compositions as modified compositions within the meaning of this invention.

Detackification Examples and Comparative Examples

These processes were performed in a pilot scale spray booth apparatus. This uses 1041 liters of water in addition to all the other components shown below. The materials, other than paint, shown under the description of specific experiment numbers below are added to the circulating water of this spray booth, either by metering in with a controlled rate pump over a period of time or by "slug feeding" a substantial quantity of additive into an inlet port in the circulating water piping, while paint is being sprayed into it in a consistent manner that approximates very closely the practical use of a full scale spray booth. The resulting solid sludge is collected and separated by means conventional for practical spray booths.

EXAMPLE 2.1

The circulating water system was turned on and the pH was adjusted to the range 9.0–9.5 by adding 50% NaOH solution in water as required. An amount of 230 milliliters (hereinafter "ml") of Composition 1.6 as described in Table 1 above was slug fed to the circulating system, and 2 minutes (hereinafter "min") later 30–40 grams (hereinafter "g") of paint (CMC™ "D03M Silver Slate Gray Metallic") was sprayed into the booth at a rate of 40–60 g/min. After 5 min of circulation, the circulation was halted long enough to determine that the paint was still tacky. Circulation was then resumed, and after 3 min an additional amount of 530 ml of Composition 1.6 was slug fed to the system. Two minutes after this addition, an additional 30–40 g of paint was sprayed into the booth, and 3 min later, circulation was stopped long enough to determine that the paint was still tacky.

TABLE 1

COMPOSITIONS AND VARIATIONS OF FREE FORMALDEHYDE CONCENTRATION WITH TIME IN MIXTURES LEADING TO MODIFIED COMPOSITIONS ACCORDING TO THIS INVENTION

| | Composition Number | | | | | | | | |
|---|---|---|---|---|---|---|---|---|---|
| | 1.1 | 1.2 | 1.3 | 1.4 | 1.5 | 1.6 | 1.7 | 1.8 | 1.9 |
| Parts by Weight in Initial Mixture of: | | | | | | | | | |
| MAGNIFLOC ™ 515C | 27 | 24 | 21 | 18 | 15 | 9 | 85 | 8 | 8 |
| BKB ™ | 3 | 6 | 9 | 12 | 15 | 1 | 15 | 2 | 1 |
| Additional Water | 0 | 0 | 0 | 0 | 0 | 0 | 0 | 0 | 1 |
| Free Formaldehyde Concentration of Mixture in ppm after: | | | | | | | | | |
| 10 minutes | | | | | | 1397 | | | |
| 1 hour | | | | | | | 1504 | | |
| 2 hours | | | | | | | 1355 | 1520 | 1592 |
| 3 hours | | | | | | | 1284 | | |
| 4 hours | | | | | | | 1319 | | |
| 5.5 hours | | | | | | 1054 | 1340 | | |
| 6–6.5 hours | | | | | | | 1279 | 1244 | 1637 |
| 7 hours | | | | | | | 1387 | | |
| 8–8.5 hours | | | | | | | 1249 | | |
| Free Formaldehyde Concentration of Mixture in ppm after: | | | | | | | | | |
| 1 day | | | | | | | | 1190 | 1500 |
| 2 days | | | | | | 980 | 1230 | 1000 | 1350 |
| 3 days | | | | | | | | 820 | 1260 |
| 4 days | | | | | | 810 | | | |
| 5 days | 750 | 599 | 375 | 187 | 102 | | | | |
| 7 days | | | | | | | 900 | 570 | 1100 |
| 10 days | | | | | | | 790 | 500 | 930 |
| 13 days | 851 | 428 | 259 | 130 | 54 | | | | |
| 14 days | | | | | | | | 450 | 800 |
| 21–22 days | | | | | | 652 | 652 | 334 | 634 |
| 28 days | 607 | 318 | 209 | 113 | 34 | | | | |
| 40 days | 406 | 263 | 141 | 74 | 16 | | | | |

Notes for Table 1
The analytical method used for the free formaldehyde values shown has an average deviation of about ±5%. Therefore, not all the digits given above are significant.
The concentration of free formaldehyde in the MAGNIFLOC ™ 515C starting material ranged from about 2050 to 2750 ppm in about ten different measurements taken over a period of several weeks, with most of the individual measurements in the range from 2050–2200 ppm. The concentration of free formaldehyde in the unmodified starting material was still at least 2000 ppm after 21 days and at least 1800 ppm after 40 days under the same storage conditions as those used to produce the data shown in this table.
Empty cells indicate that no measurement was made at the indicated time.

Circulation was immediately resumed, and after 2 min an additional 500 ml of Composition 1.6 was slug fed into the system. The pH of the circulating water was again measured and found to be 8.5. Most of the paint was now observed to have been detackified, but some was still tacky. An additional 500 ml of Composition 1.6 was added, and detackification was essentially complete, except for a slight amount of tacky paint on foam in the booth. The pH of the circulating water system was then 8.0.

EXAMPLE 2.2 AND COMPARISON EXAMPLE 2.2

In these examples the paint used was a DuPont Metallic Blue. In Example 2.2, the sequence of events was much like that of Example 2.1, with successive additions of Composition 1.6 and paint and additions of 50% NaOH in water as needed to maintain the pH between 9.0 and 9.5, until virtually complete detackification of 936 g of paint was achieved with the addition of 427 ml of Composition 1.6.

In Comparison Example 2.2, a composition made by mixing 9 parts by weight of MAGNIFLOC™ 515 C with 1 part by weight of water, so that it contained the same concentration of dispersed melamine-formaldehyde polymer solids as Composition 1.6, was used instead of Composition 1.6. Much less effective detackification of a similar amount of the same kind of paint was achieved with a similar amount of this comparison composition.

EXAMPLE 2.3

In this example, the modified Composition 1.8 as described in Table 1 was used as the detackifier, and the paint was a Du Pont red-blue metallic base blend with a viscosity of 24 seconds in a #2 Zahn Cup. The pH was initially adjusted to 9.25. Before any paint had been sprayed into the test booth, foaming was observed, so that 10 ml of a conventional hydrocarbon emulsion defoamer (P3™ Defoamer 2483, commercially available from Henkel Corporation) was added to the circulating water, and it was observed that the pH had fallen to 9.14. Continuously metered additions of Composition 1.8, of a 0.1% solution in water of a commercial polyacrylamide flocculant (Type 494 C from American Cyanamid), and of 50% NaOH in water ("alkalinizer") to the circulating water supply were then begun, and paint began to be sprayed into the booth at a rate of about 60 g/min. After five minutes, when amounts of 220 ml of Composition 1.8 and 150 ml of alkalinizer had been added, good detackification and substantially clear circulating water with a slight amount of entrained floc were observed. After two minutes, an additional 3 ml of the same defoamer was added. After an additional five minutes, an additional 200 ml of Composition 1.8 was added along with an additional 75 ml of the alkalinizer. Good detackification and clear water as before were observed to continue. During the next ten minutes, additions of the same materials were continued, so that the total inputs, twenty minutes after starting the run, had reached 820 ml of Composition 1.8, 315 ml of alkalinizer, 999 g of paint and 2.0 liters of the flocculant solution. The addition of alkalinizer was then discontinued, as the pH had risen to 9.8. Additions of Composition 1.8, of paint, and of flocculant were continued for another five minutes, one addition of 3 ml of the same defoamer as before was added during this interval, and the detackification and water clarity continued to be satisfactory.

At the completion of the run, after a total of 25 min of operation, the total materials added were 880 ml of Composition 1.8, 315 ml of alkalinizer, 2550 ml of the flocculant solution, 1248 g of paint, and 16 ml of defoamer.

GROUP II-EXAMPLES INCLUDING UREA AND COMPARISONS THEREWITH

For this group, various formulations containing urea and acetoacetamide and/or dicyandiamide, some of which also contained other ingredients, and some comparison examples, were prepared, using the same MAGNIFLOC™ 515-C melamine-formaldehyde resin and other tradenamed ingredients as before. The compositions and some results are shown as entries numbered 2.1–2.38 in Table 2 below. These compositions, when they achieve sufficient reduction in formaldehyde content and freedom from precipitates, are used for detackification in the same general manner as illustrated in Group I.

TABLE 2

| Composition No. | Parts by Weight in Composition of: | | | | | | | HCHO | |
|---|---|---|---|---|---|---|---|---|---|
| | 515-C | BKB | Urea | DiCy | NaHSO$_3$ | Cit A | H$_2$O | Content, ppm | Precipitate? |
| 2.1 | 99.25 | 0.25 | 0.50 | | | | | 850 | yes |
| 2.2 | 99.0 | 0.5 | 0.5 | | | | | 770 | yes |
| 2.3 | 98.5 | 0.5 | 0.5 | 0.5 | | | | 790 | yes |
| 2.4 | 99.0 | 0.5 | | 0.5 | | | | 770 | yes |
| 2.5 | 99.5 | | 0.5 | | | | | 870 | yes |
| 2.6 | 99.5 | 0.5 | | | | | | 1430 | no |
| 2.7 | 99.5 | | | | 0.5 | | | 2140 | no |
| 2.8 | 99.0 | 0.5 | | | 0.5 | | | 1998 | no |
| 2.9 | 99.0 | 0.5 | | | | 0.5 | | 1920 | no |
| 2.10 | 98.5 | | 0.5 | | | 0.5 | | 840 | yes |
| 2.11 | 98.9 | 1.0 | 0.1 | | | | | 1520 | no |
| 2.12 | 94.9 | 5.0 | 0.1 | | | | | 1170 | no |
| 2.13 | 98.8 | 1.0 | 0.2 | | | | | 1210 | no |
| 2.14 | 94.8 | 5.0 | 0.2 | | | | | 1000 | no |
| 2.15 | 98.9 | 1.0 | | 0.1 | | | | 1910 | no |
| 2.16 | 94.9 | 5.0 | | 0.1 | | | | 1600 | no |
| 2.17 | 98.8 | 1.0 | | 0.2 | | | | 1940 | no |
| 2.18 | 94.8 | 5.0 | | 0.2 | | | | 1650 | no |
| 2.19 | 93.5 | 1.0 | | 0.5 | | | 5.0 | 1720 | no |
| 2.20 | 93.5 | 1.0 | 0.5 | | | | 5.0 | 820 | no |
| 2.21 | 94.7 | 5.0 | 0.3 | | | | | 1010 | no |
| 2.22 | 94.6 | 5.0 | 0.4 | | | | | 850 | no |
| 2.23 | 94.5 | 5.0 | 0.5 | | | | | 830 | no |
| 2.24 | 84.7 | 5.0 | 0.3 | | | | 10.0 | 920 | no |
| 2.25 | 84.6 | 5.0 | 0.4 | | | | 10.0 | 740 | no |
| 2.26 | 84.5 | 5.0 | 0.5 | | | | 10.0 | 650 | no |
| 2.27 | 99.0 | | 0.5 | 0.5 | | | | 780 | no |
| 2.28 | 99.9 | | 0.1 | | | | | 1230 | no |
| 2.29 | 99.8 | | 0.2 | | | | | 1050 | no |
| 2.30 | 99.0 | 1.0 | | | | | | 1430 | no |
| 2.31 | 95.0 | 5.0 | | | | | | 1250 | no |
| 2.32 | 100 | | 0.1 | | | | | 1310 | no |
| 2.33 | 100 | | 0.2 | | | | | 1170 | no |
| 2.34 | 100 | 5.0 | | | | | | 1180 | no |
| 2.35 | 100 | 5.0 | 0.1 | | | | | 1020 | no |
| 2.36 | 100 | 5.0 | 0.2 | | | | | 850 | no |
| 2.37 | 100 | 1.0 | 0.2 | | | | | 1040 | no |
| 2.38 | 100 | 1.0 | | | | | | 1560 | no |

Notes for Table 2
"515-C" means the melamine-formaldehyde resin described in detail as part of Group I, the particular lot used having a free formaldehyde content of 0.186%;
"DiCy" means dicyandiamide;
"Cit A" means citric acid; and
"HCHO Content, ppm" means the concentration of free formaldehyde determined twenty-four hours after mixing the composition as noted.
In the column headed "Precipitate?", "yes" means precipitate settled on the bottom of the container of the composition noted was visually observable within 15 days after mixing; "no" means no such precipitate was observable after 15 days of storage.
In the columns under the "Parts by Weight . . ." heading, blank spaces indicate no deliberate addition of the material in question, while in the two rightmost columns in the table, blank spaces indicate no measurement was made.

The invention claimed is:

1. A process of reducing the free aldehyde content of an amino resin, said process comprising steps of:
   (i) providing an initial amino resin dispersion containing from 0.10 to about 0.35% by weight based on the weight of the initial dispersion of free aldehyde;
   (ii) mixing, either sequentially or simultaneously, with the initial amino resin dispersion provided in step (i):
      (a) an amount of modifying reagent molecules that are soluble in the initial amino resin dispersion and include a structure according to formula I:

in which each of $Q^1$ and $Q^3$ independently is one of $=O$, $=NH$, or $=N$; $Q^2$ is C or N, such that the ratio of the stoichiometric equivalent as acetoacetamide of the total amount of said modifying reagent added to the content of free aldehyde of the resin provided in step (i) is from 0.5:1.0 to 50:1.0; and
      (b) an amount of a component selected from molecules that do not belong to component (a) but do contain at least one amino moiety that can react with an aldehyde molecule to form a single molecule product in which the nitrogen atom from the amino moiety has become covalently bonded to the carbon atom from the aldehydo moiety, such that the ratio by weight of the total stoichiometric equivalent as urea of component (b) to the total stoichiometric equivalent as acetoacetamide of component (a) is from about 1:100 to about 1.0:0.40; and
   (iii) allowing the mixture formed in step (ii) to undergo spontaneous chemical reaction, at a temperature at which the mixture is liquid, to produce a modified amino resin dispersion in which the concentration of free aldehyde in the modified amino resin dispersion is not greater than about 0.20% by weight based on the weight of the modified amino resin dispersion and is not greater than about 80% by weight of the concentration of free aldehyde in the initial amino resin dispersion provided in step (i).

2. A process according to claim 1 of reducing the free formaldehyde content of a melamine-formaldehyde resin dispersion in water, said process comprising steps of:
   (i) providing an initial aqueous resin dispersion containing from about 1 to about 20% by weight based on the weight of the initial dispersion of dispersed melamine-formaldehyde polymer solids and from about 0.10 to about 0.35% by weight based on the weight of the initial dispersion of free formaldehyde;
   (ii) mixing with the initial aqueous resin dispersion provided in step (i) an amount of component (ii) (a) and an amount of component (ii) (b) such that the ratio by weight of the total stoichiometric equivalent as urea of component (ii) (b) to the total stoichiometric equivalent as acetoacetamide of component (ii) (a) is from about 1:100 to about 1.0:0.40; and
   (iii) allowing the mixture formed in step (ii) to undergo spontaneous chemical reaction, at a temperature at which the mixture is liquid, to produce a modified resin dispersion in which the concentration of free formaldehyde is not greater than about 0.20% by weight based on the weight of the modified resin dispersion and is not greater than about 80% by weight of the concentration of free formaldehyde in the initial resin dispersion provided in step (i).

3. A process according to claim 2, wherein: the dispersion provided in step (i) contains from about 6.0 to about 12.0% by weight based on the weight of the initial dispersion of dispersed melamine-formaldehyde polymer solids and has a pH in the range from about 1.5 to about 2.3; the ratio of the stoichiometric equivalent as acetoacetamide of component (ii) (a) to the free formaldehyde content of the resin provided in step (i) is from about 1.2:1.0 to about 11:1.0; the ratio by weight of the total stoichiometric equivalent as urea of component (ii) (b) to the total stoichiometric equivalent as acetoacetamide of component (ii) (a) is from about 1:20 to about 1.0:1.2; the free formaldehyde content of the modified resin dispersion is not greater than about 0.11% by weight based on the weight of the modified resin dispersion; and the pH of the modified resin dispersion is from about 1.5 to about 2.3.

4. A process according to claim 3, wherein: the dispersion provided in step (i) contains from about 7.0 to about 10.0% by weight based on the weight of the initial dispersion of dispersed melamine-formaldehyde polymer solids; the ratio of the total stoichiometric equivalent as acetoacetamide of component (ii) (a) to the free formaldehyde content of the resin provided in step (i) is from about 1.3:1.0 to 8.0:1.0; the ratio by weight of the total stoichiometric equivalent as urea of component (ii) (b) to the total stoichiometric equivalent as acetoacetamide of component (ii) (a) is from about 1:9.0 to about 1.0:2.8; and the free formaldehyde content of the modified resin dispersion is not greater than about 0.10% by weight based on the weight of the modified dispersion.

5. A process according to claim 4, wherein the dispersion provided in step (i) contains from about 8.0 to about 9.0% by weight based on the weight of the initial dispersion of dispersed melamine-formaldehyde polymer solids; the ratio of the total stoichiometric equivalent as acetoacetamide of component (ii) (a) to the free formaldehyde content of the resin provided in step (i) is from about 1.3:1.0 to about 7.0:1.0; the ratio by weight of the total stoichiometric equivalent as urea of component (ii) (b) to the total stoichiometric equivalent as acetoacetamide of component (ii) (a) is from about 1.0:9.0 to about 1.0:2.4; and the free formaldehyde content of the modified resin dispersion is not greater than about 0.095% by weight based on the weight of the modified dispersion.

6. A process according to claim 5, wherein the ratio of the total stoichiometric equivalent as acetoacetamide of component (ii) (a) to the free formaldehyde content of the resin provided in step (i) is from about 1.5:1.0 to about 1.8:1.0, component (ii) (b) is urea, the ratio of urea to the total stoichiometric equivalent as acetoacetamide of component (ii) (a) is from about 1.0:8.0 to about 1.0:4.0, the free formaldehyde content of the modified resin dispersion is not greater than about 0.090% by weight based on the weight of the modified dispersion, and the pH of the modified resin dispersion is from about 1.7 to about 2.1.

7. A process of detackifying paint entrained in a first aqueous liquid composition by mixing with said first aqueous composition a detackifying effective amount of a second aqueous liquid composition which is a dispersion consisting essentially of water and:
   (A') from about 1 to about 20% by weight based on the weight of the dispersion of dispersed melamine-formaldehyde polymer solids;
   (B') from about 0.005 to about 0.20% by weight based on the weight of the dispersion of free formaldehyde;
   (C') at least one product of reaction between free formaldehyde and water soluble modifying reagent molecules selected from the group consisting of diketo compounds and their nitrogen analogs; and (D') at least one product of reaction between free formaldehyde and molecules that are not diketo compounds or their nitrogen analogs but do contain at least one formaldehyde-reactive amino moiety; and, optionally one or both of the following:

(E') unreacted modifying reagent molecules selected from the group consisting of diketo compounds and their nitrogen analogs; and (F') unreacted molecules that are not diketo compounds or their nitrogen analogs but do contain at least one formaldehyde-reactive amino moiety;

the total stoichiometric equivalent as acetoacetamide value in said dispersion being from about 0.05 to about 17.5% by weight based on the weight of said dispersion; said dispersion having a total stoichiometric equivalent as urea value and a total stoichiometric equivalent as acetoacetamide value such that the ratio of the total stoichiometric equivalent as urea value to the total stoichiometric equivalent as acetoacetamide value is at least about 1.0:30.

8. A process according to claim 7, wherein in said second aqueous liquid composition which is a dispersion the amount of free formaldehyde in the dispersion is from about 0.01 to about 0.16% by weight based on the weight of said dispersion, the total stoichiometric equivalent as acetoacetamide is from about 0.08 to about 6% by weight based on the weight of said dispersion, the ratio of the total stoichiometric equivalent as urea to the total stoichiometric equivalent as acetoacetamide is from about 1.0:30 to 1.0:1.6, and the ratio of the amount of said second aqueous liquid composition which is a dispersion added to the amount of paint entrained in said first aqueous liquid composition is from about 0.05:1.0 to about 1.5:1.0.

9. A process according to claim 8, wherein in said second aqueous liquid composition which is a dispersion the concentration of melamine-formaldehyde polymer solids in the dispersion is from about 6.0 to about 12.0 by weight based on the weight of the dispersion, the amount of free formaldehyde in the dispersion is from about 0.022 to about 0.12% by weight based on the weight of said dispersion, the total stoichiometric equivalent as acetoacetamide is from about 0.15 to about 2.0% by weight based on the weight of said dispersion, the ratio of the total stoichiometric equivalent as urea to the total stoichiometric equivalent as acetoacetamide is from about 1.0:15 to 1.0:2.0; and the ratio of the amount of said second aqueous liquid composition which is a dispersion added to the amount of paint entrained in said first aqueous liquid composition is from about 0.09:1.0 to about 1.0:1.0.

10. A process according to claim 9, wherein in said second aqueous liquid composition which is a dispersion the amount of free formaldehyde in the dispersion is from about 0.027 to about 0.10% by weight based on the weight of said dispersion, the total stoichiometric equivalent as acetoacetamide is from about 0.22 to about 1.8% by weight based on the weight of said dispersion the ratio of the total stoichiometric equivalent as urea to the total stoichiometric equivalent as acetoacetamide is from about 1.0:12.0 to 1.0:2.8; and the ratio of the amount of said second aqueous liquid composition which is a dispersion added to the amount of paint entrained in said first aqueous liquid composition is from about 0.11:1.0 to about 0.70:1.0.

11. A process according to claim 10, wherein in said second aqueous liquid composition which is a dispersion the concentration of melamine-formaldehyde polymer solids in the dispersion is from about 6.0 to about 10.0% by weight based on the weight of said dispersion, the amount of free formaldehyde in the dispersion is from about 0.030 to about 0.095% by weight based on the weight of said dispersion, the total stoichiometric equivalent as acetoacetamide is from about 0.22 to about 1.5% by weight based on the weight of said dispersion, and the ratio of the total stoichiometric equivalent as urea of component (ii) (b) to the total stoichiometric equivalent as acetoacetamide is from about 1.0:9.0 to 1.0:4.0; and the ratio of the amount of said second aqueous liquid composition which is a dispersion added to the amount of paint entrained in said first aqueous liquid composition is from about 0.13:1.0 to about 0.40:1.0.

12. A process according to claim 11, wherein in said second aqueous liquid composition which is a dispersion the concentration of melamine-formaldehyde polymer solids in the dispersion is from about 6.8 to about 9.0% by weight based on the weight of said dispersion, the amount of free formaldehyde in the dispersion is from about 0.030 to about 0.090% by weight based on the weight of said dispersion, the total stoichiometric equivalent as acetoacetamide is from about 0.27 to about 1.0% by weight based on the weight of said dispersion the ratio of the total stoichiometric equivalent as urea to the total stoichiometric equivalent as acetoacetamide is from about 1.0:8.0 to 1.0:4.8; and the ratio of the amount of said second aqueous liquid composition which is a dispersion added to the amount of paint entrained in said first aqueous liquid composition is from about 0.14:1.0 to about 0.31:1.0.

13. A process according to claim 12, wherein in said second aqueous liquid composition which is a dispersion, the concentration of melamine-formaldehyde polymer solids is from about 6.8 to about 8.5% by weight based on the weight of said dispersion, the total stoichiometric equivalent as acetoacetamide is from about 0.27 to about 0.50% by weight based on the weight of said dispersion, and the ratio of the total stoichiometric equivalent as urea to the total stoichiometric equivalent as acetoacetamide is from about 1.0:7.6 to 1.0:6.0; and the ratio of the amount of said second aqueous liquid composition which is a dispersion added to the amount of paint entrained in said first aqueous liquid composition is from about 0.15:1.0 to about 0.28:1.0.

* * * * *